Feb. 27, 1940. J. A. HUSSY 2,191,663
CYCLE
Filed Feb. 19, 1938
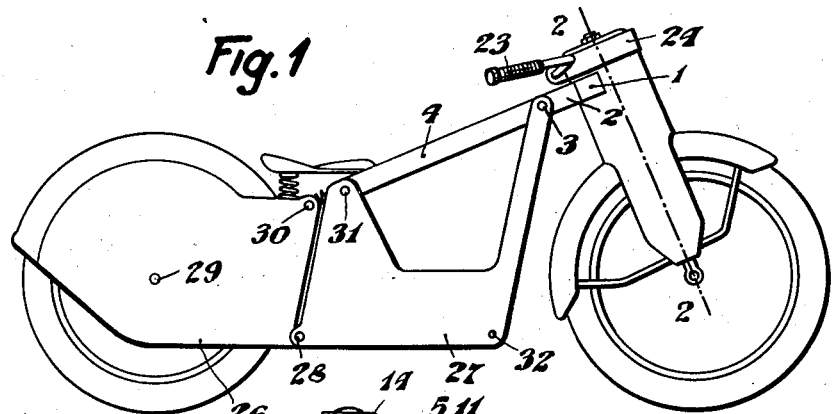
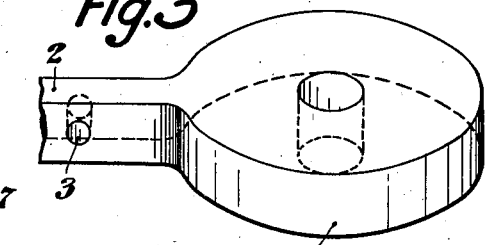
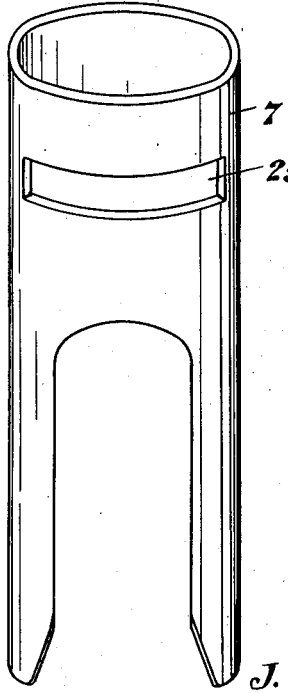
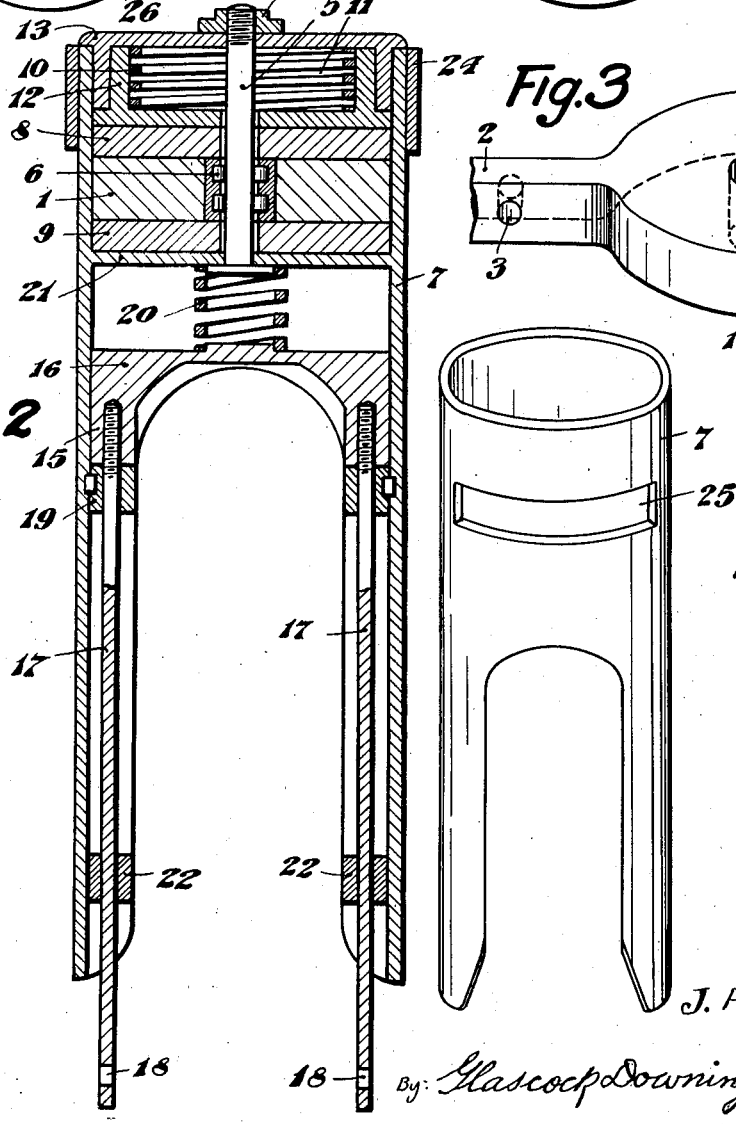
J. A. Hussy
INVENTOR
By Glascock Downing & Seebold
Attys.

Patented Feb. 27, 1940

2,191,663

UNITED STATES PATENT OFFICE 2,191,663

CYCLE

Jacques Auguste Hussy, Geneva, Switzerland

Application February 19, 1938, Serial No. 191,530
In Switzerland February 25, 1937

1 Claim. (Cl. 280—279)

This invention relates to cycles, and more particularly to a steering mechanism for a motor-cycle, bicycle or tricycle.

It is an object of the invention to provide a steering mechanism for a motor or other cycle of improved construction, whereby the rigidity of the mechanism is increased, any distortion of the front wheel relative to the frame of the cycle avoided, the control of the steering facilitated and lateral unstability of the steering stem prevented, while at the same time providing an aerodynamic enclosure of the entire mechanism.

The accompanying drawing illustrates a practical embodiment of the invention.

Figure 1 is an elevation of a motor-cycle according to the invention.

Figure 2 is a section through the steering mechanism along the line 2—2 in Fig. 1.

Figures 3 and 4 show details of the steering mechanism.

The vehicle frame carries a relatively stationary disk 1 having an extension 2 which is rigidly secured at the point 3 to the frame 4 of the motor-cycle. The disk 1 is traversed by a relatively rotatable stem 5 and a roller bearing 6 is interposed between the stem 5 and the disk 1. The stem 5 carries a forked sleeve 7 which is coaxial with the stem. Two friction disks 8 and 9 are disposed on either side of the disk 1 and arranged to turn with the sleeve 7 and the stem 5, but are movable in axial direction. A spring 10 is enclosed in a chamber 11 formed between an axially movable cup 12 and a cover member 13 which is fixed to the sleeve 7 by a nut 14 screwing on the end of the stem 5. The spring 10 constantly applies the friction disks 8 and 9 against the stationary disk 1.

Within the sleeve 7 can slide a fork member 15 which is connected as usual to the axle of the front wheel. This fork is composed of a plunger member 16 slidably adjusted within the sleeve 7, and of two rods 17 screwed into the plunger 16 and provided with bearings 18 at their lower ends for receiving the front wheel axle. Brackets 19, fixed to the sleeve 7, limit the downward movement of the fork member relative to the sleeve. A shock absorbing spring 20 is inserted between a partition 21 of the sleeve 7 and the plunger 16. The two rods 17 penetrate guide pieces 22 secured to the lower part of the forked portion of the sleeve 7.

The handle-bar 23 is fixed to a strap 24 surrounding the sleeve 7 and rigid with it. The sleeve 7 is provided with an opening 25 through which penetrates the arm 2 of the disk 1, so as to permit rotation of the sleeve relative to the disk and to its arm.

When the driver acts on the guide-bar, the sleeve 7, stem 5 and fork 16 turn with the front wheel relative to the disk 1 and to the frame of the cycle. The fork 16 can axially slide relative to the sleeve against the action of the spring 20 which absorbs the shocks to which the front wheel is subjected when driving on a road. Owing to the spring 10 applying the friction disks 8 and 9 against the disk 1, a certain effort must be exerted to turn the sleeve 7.

The frame 4 can be of any conventional type used in motor-cycles. In the represented example, the rear part 26 of the frame is hingedly connected to the front part 27 about an axis 28. At the points 28, 29, 30, 31, 32 and 3, sheet metal pieces can be screwed to the frame members, whereby cycle bodies of any desired shape can be obtained.

I claim:

In a cycle steering mechanism, the combination with a frame, of an inclined supporting disk rigid with said frame and forming the only support of said mechanism, a forked outer sleeve divided by a transverse partition into an upper part mounted to rotate on said disk and a lower part adapted to receive the front wheel carrying fork, a central stem solid with said partition and extending axially therefrom into the upper part of the sleeve to traverse said supporting disk, a roller bearing interposed between said stem and disk, spring pressed friction rings disposed on said stem on either side of said supporting disk and adapted to rotate with said stem, a guide bar rigid with said sleeve, and spring means for constantly applying said friction rings and supporting disk against one another.

JACQUES AUGUSTE HUSSY.